US009505936B1

(12) United States Patent
Crawford et al.

(10) Patent No.: US 9,505,936 B1
(45) Date of Patent: Nov. 29, 2016

(54) ULTRA-VIOLET CURE COATING

(71) Applicant: The United States of America Army Research Laboratory, Washington, DC (US)

(72) Inventors: Dawn Marie Crawford, Bel Air, MD (US); John Andrew Escarsega, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/932,119

(22) Filed: Jul. 1, 2013

Related U.S. Application Data

(60) Provisional application No. 61/668,740, filed on Jul. 6, 2012.

(51) Int. Cl.
*C09D 5/30* (2006.01)

(52) U.S. Cl.
CPC ....................................... *C09D 5/30* (2013.01)

(58) Field of Classification Search
CPC ............................... C09D 5/30; C09D 11/101
See application file for complete search history.

(56) References Cited

U.S. PATENT DOCUMENTS

| | | | |
|---|---|---|---|
| 5,194,487 A | | 3/1993 | Jacobs |
| 5,200,489 A | | 4/1993 | Jacobs et al. |
| 5,492,961 A | * | 2/1996 | Brock et al. ................. 524/539 |
| 5,691,410 A | | 11/1997 | Escarsega et al. |
| 6,454,848 B2 | | 9/2002 | Sliwinski et al. |
| 6,566,444 B1 | * | 5/2003 | Gobel et al. .................. 524/589 |
| 7,041,708 B2 | | 5/2006 | Gambino et al. |
| 7,396,875 B2 | * | 7/2008 | Lockhart et al. ............. 524/840 |
| 2012/0041145 A1 | | 2/2012 | Blum et al. |

OTHER PUBLICATIONS

Bayferrox 318M product information sheet from LanXess. pp. 1-5 (Aug. 8, 2014).*
ARL Technical Report No. 6163 titled "Rapid (Ultra-violet) Cure Chemical Agent Resistant Coating (CARC)" published for government only in Sep. 2012.
ARL Technical Report No. 6284 titled "Ultraviolet Cure Coating Demonstration on Helicopter Rotor Blade Sections" published for government only in Dec. 2012.
Slide Presentation titled "The Validation and Approval of Chemical Agent Resistant Coatings" that was presented at the ASETSDefense on Aug. 28, 2012.
Asif, A., Huang, C. Y., Shi, W. F., Photopolymerization of Waterborne Polyurethane Acrylate Dispersions Based on Hyperbranched Aliphatic Polyester and Properties of the Cured Films, Colloid Polym. Sci. 2005, vol. 283, pp. 721-730.
Crawford, D. M.; Escarsega, J. A.; Dynamic Mechanical Analysis of Novel Polyurethane Coating for Military Vehicles. thermochimica acta 2000, 357-358, 161.
Escarsega, J. A.; Crawford, D. M.; Duncan, J. L.; Chesonis, K. G.; Development of Water-Reducible Polyurethane Coating for Military Applications; ARL-TR-1950; U. S. Army Research Laboratory: Aberdeen Proving Ground, MD, May 1999.
Hegedus, C. R., Gilicinski, A. G., Haney, R. J., Film Formation Mechanism of Two-Component Waterborne Polyurethane Coatings, Journal of Coatings Technology, vol. 68, No. 852, pp. 51-61, 1996.
Koleske, J. V., ed., Paint and Coating Test Manuel, ASTM International, West Conshohocken, PA, 2012, p. 632.
Neag, C. M., Coating Characterization by Thermal Analysis, ASTM Manual 17, American Society for Testing and Materials, 1995, pp. 841-864.
Orbey, N., UV-Curable Aerospace and Aircraft Coatings, RadTech Report, Jul./Aug. 2006.
Jahn, R., Jung, T., Relationship Between Pigment Properties and UV-curing Efficiency, Progress in Organic Coatings 2001, 43, 50-55.
Seo, J., Jang, E-S., Song, J-H., Choi, S., Khan, S.B., Han, H., Preparation and Properties of Poly(urethane acrylate) Films for Ultraviolet-Curable Coatings, J. Appl. Polym. Sci., 2010, 118, pp. 2454-2460.
Skrovanek, D. J., Schoff, C. K., Thermal Mechanical Analysis of Mechanical Coatings, Progress in Organic Coatings, vol. 16, 1988, pp. 135-163.
Strazisar, S., Kendi, M., Facke, T., Hermans-Blackburn, L., Feng, X. S., New High-Throughput Screening Tool for the Evaluation of Pigmented UV-A Curable Coatings-A Case Study Using Low Energy Lamps, Journal of Coatings Technology Research, 2006, vol. 3, No. 4, pp. 307-312.
Van der Berg, K., J., Development of Waterborne UV-A Curable Clear Coat for Car Refinishes, Progress in Organic Coatings, 61, 2008, pp. 110-118.
Yang, Z, Wicks, D. A., Yuan, J., Pu, H., Liu, Y., Newly UV-curable Polyurethane Coatings Prepared by Multifunctional thiol and ene-terminated Polyurethane Aqueous Dispersions: Photopolymerization Properties, Polymer, 51, 2010, pp. 1572-1577.

* cited by examiner

*Primary Examiner* — Sanza McClendon
(74) *Attorney, Agent, or Firm* — Christos S. Kyriakou

(57) ABSTRACT

Several low observable aqueously dispersed polymeric materials with dual cure properties utilizing both ambient and UV curing modalities are provided. Compositions are suitable for coating a substrate such as those used in military, hunting, or other applications for which low visibility is desired. A water dispersible low observable curable composition includes an aqueously dispersed hydroxyl functional polyurethane resin, an aqueously dispersed urethane acrylate resin; and one or more low solar absorbing pigments. In some embodiments, the acrylate resin present at less than 50% total resin weight. Preferred pigments include those that are cobalt free, do not absorb significant UV radiation during cure, and provide reduced surface temperature resulting in low IR signature. Illustrative pigments include chromium oxide green, magnesium ferrite, red iron oxide ($Fe_2O_3$), black iron oxide ($Fe_3O_4$), zinc ferrite ($ZnFe_2O_4$), or combinations thereof.

23 Claims, 6 Drawing Sheets

ULTRA-VIOLET CURE COATING

CROSS-REFERENCE TO RELATED APPLICATIONS

This patent application claims the benefit of U.S. Provisional Patent Application No. 61/668,740 titled "Ultra-Violet Cure Coating" filed on Jul. 6, 2012 the entire contents which are hereby incorporated by reference herein including all attachments and other documents that were incorporated by reference in U.S. Provisional Patent Application No. 61/668,740.

GOVERNMENT INTEREST

The invention described herein may be manufactured, used, and licensed by or for the United States Government.

FIELD OF THE INVENTION

The invention relates to curable compositions that can be used as a protective layer, a paint, or other coating. More specifically, coating compositions are provided that include multiple curing modalities to improve cure times and coating performance for several applications illustratively camouflage paints.

BACKGROUND OF THE INVENTION

Materials that can be used to provide electro-optical signature reduction, termed low observable coatings, are desirable for use in military vehicles to provide resistance to visibility in both the visual and/or infrared spectrums. Prior camouflage Chemical Agent Resistant Coatings (CARC) were developed to address low visibility needs in the visual and near infrared (IR) bands. For example, the three color woodland pattern and the desert tan match the visual effects of the background, and in the near IR the green color matches the sharp reflectance rise of chlorophyll present in all green foliage. In 1985, CARC became the standard camouflage coating for the Army as: MIL-C-46168, based on a two component urethane consisting of a aliphatic diisocyanate and a saturated polyester.

Unfortunately, the original CARC materials were deemed unsuitable for continued use due to poor performance and high volatile organic content (VOC) resulting from the use of the materials used in the formulation of CARC. In response, a water dispersible CARC was formulated as described in U.S. Pat. No. 5,691,410. While this material addressed the environmental concerns, it has become increasingly clear that the long dry times required for cure of these CARC materials is a detriment to their wide scale use.

As such, new compositions suitable for use in low observable coatings are needed.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Compositions suitable for coating a substrate such as those used in military, hunting, or other application for which low visibility is desired are provided. The water dispersible low observable coatings provided herein are environmentally acceptable, rapid curing, and provide superior performance. A water dispersible low observable curable composition includes an aqueously dispersed hydroxyl functional polyurethane resin, an aqueously dispersed urethane acrylate resin; and one or more low solar absorbing pigments. In some embodiments, the acrylate resin present at less than 50% total resin weight. Preferred pigments include those that are cobalt free, do not absorb significant UV radiation during cure, and provide reduced surface temperature resulting in low IR signature. Illustrative pigments include chromium oxide green, magnesium ferrite, red iron oxide ($Fe_2O_3$), black iron oxide ($Fe_3O_4$), zinc ferrite ($ZnFe_2O_4$), or combinations thereof.

DETAILED DESCRIPTION OF EMBODIMENTS OF THE INVENTION

Figure 1:
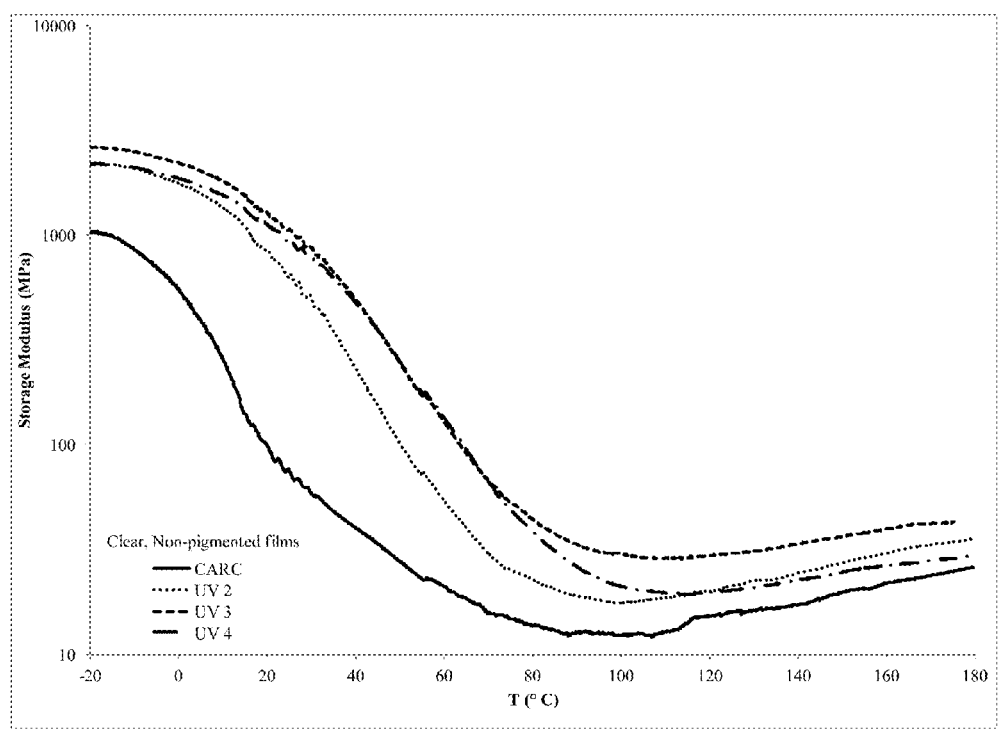
FIG. 1 illustrates dynamic mechanical analysis of a coating according to one embodiment using unpigmented material demonstrating storage modulus 2 days following lamp exposure.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the compositions are described as using specific materials in a particular order, it is appreciated that described materials or order may be interchangeable such that the description of the invention includes multiple parts or steps arranged in many ways as is readily appreciated by one of skill in the art.

A low observable coating composition is provided that allows rapid curing. In certain desirable embodiments the coating compositions of the present invention provide hard, chemically resistant coated surfaces that are useful for low optical detection applications such as military vehicles. Thus, the invention has utility as a low observable coating.

Generally, the composition includes an aqueously dispersed hydroxyl functional polyurethane resin, an aqueously dispersed urethane acrylate resin, and one or more low solar absorbing pigments.

Preferably, the aqueously dispersed hydroxyl functional polyurethane resin is a polyurethane resin with hydroxyl functionality that is dispersible in water. Illustrative examples of an aqueously dispersed hydroxyl functional polyurethane resin include those based on high molecular weight polyols known from standard polyurethane chemistry, illustratively those with molecular weights of 400 to 6,000 Da, optionally 400 to 3,000 Da. Numerous examples of such molecules are known in the art, illustratively as described in U.S. Pat. No. 5,194,487. Specific examples of polyols useful for the formation of an aqueously dispersed hydroxyl functional polyurethane include: polyhydroxy polyesters obtained from polyhydric alcohols to which trihydric alcohols may be added and polybasic carboxylic acids; polylactones such as polymers of ε-caprolactone initiated with a polyhydric alcohol; polycarbonates containing hydroxyl groups; polyethers; polyether esters containing isocyanate-reactive group; polythioethers; polyacetals; polyester amides and polyamides. In some embodiments, hydroxyl functional polyurethane dispersions are the ambient cure resin sold as Bayhydrol XP-7110E or Bayhydrol XP-2591 from Bayer Material Science, Pittsburgh, Pa.

An aqueously dispersed hydroxyl functional polyurethane resin is optionally combined with a first crosslinking agent. A crosslinking agent is optionally a water dispersible polyisocyanate. An aqueously dispersed hydroxyl functional polyurethane resin optionally has a hydroxy functionality of at least 1.8, optionally 1.8 to 8, optionally 2 to 6, or optionally 2.5 to 6; a total content of urethane and urea groups of 9% to 20% by weight, optionally about 10% to 17% by weight; and an average hydroxy equivalent weight (which may be calculated by an end group analysis) of about 100 to 5000, optionally 500 to 4000, or optionally 1000 to 3000. A water dispersible aliphatic polyisocyanate material is optionally based on hexamethylene diisocyanate (HDI) where the isocyanate functional group (NCO) content ranges from 18.95 to 19.45 percent and which has an equivalent weight average of 220 Da. Illustrative polyurethane resins include, but are not limited to, the polyurethane resins described in U.S. Pat. No. 5,194,487.

The hydroxy functional polyurethanes are formed by reacting one or more organic polyisocyanates with one or more high molecular weight polyols, optionally low molecular weight isocyanate-reactive compounds, wherein at least one of isocyanate-reactive compounds contains anionic or potential anionic groups and isocyanate-reactive compounds containing nonionic hydrophilic groups.

A low observable coating composition also includes an aqueously dispersed urethane acrylate resin. Illustrative examples of a urethane acrylate resin suitable for aqueous dispersion include, but are not limited to, those described in U.S. Pat. Nos. 7,041,708 and 7,396,875, and particularly U.S. Patent Application Publication No: 2012/0041145.

An aqueously dispersed urethane acrylate resin is optionally formed of (A) one or more compounds of monohydroxy-functional alcohols containing (meth)acrylate groups, (B) polyester polyols obtainable from aliphatic diols having 2 to 4 carbon atoms between the two OH functions and/or aliphatic triols or aromatic di- and/or tricarboxylic acids, and (C) one or more compounds having at least one group which is reactive towards isocyanate, and additionally groups which are nonionic, ionic or capable of the formation of ionic groups, which have a dispersing action for the polyurethane dispersion.

Component A optionally includes monohydroxy-functional alcohols containing (meth)acrylate groups. Such monohydroxy-functional alcohols containing (meth)acrylate groups are, for example, 2-hydroxyethyl (meth)acrylate, caprolactone-lengthened modifications of 2-hydroxyethyl (meth)acrylate, such as Pemcure® (Cognis, DE), 2-hydroxypropyl (meth)acrylate, 4-hydroxybutyl (meth)acrylate, 3-hydroxy-2,2-dimethylpropyl (meth)acrylate and the di-, tri- or penta(meth)acrylates, which are on average monohydroxy-functional, of polyhydric alcohols, such as trimethylolpropane, glycerol, pentaerythritol, ditrimethylolpropane, dipentaerythritol and ethoxylated, propoxylated or alkoxylated trimethylolpropane, glycerol, pentaerythritol, ditrimethylolpropane, dipentaerythritol or technical grade mixtures thereof.

Component B is optionally formed from hydroxyfunctional polyesters that are built up from aliphatic diols having 2 to 4 carbon atoms between the two OH functions, illustratively, 1,2-ethanediol, 1,2-propanediol, 1,3-propanediol, neopentyl glycol, 2-ethyl-2-butylpropanediol, 1,3-butanediol, 1,2- and 1,4-cyclohexanediol and/or 1,4-butanediol. Other examples used alone or in addition include aliphatic triols, illustratively, trimethylolethane, trimethylolpropane, trimethylolbutane, glycerol and/or castor oil, and aromatic di- and/or tricarboxylic acids, such as, for example, phthalic acid, phthalic anhydride, isophthalic acid, terephthalic acid and/or trimellitic acid and the anhydrides of the acids.

Component C may include monomeric mono-, di- and/or triols in each case having a molecular weight of from 32 to 240 g/mol, such as e.g. methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropionic acid (2,2-dimethyl-3-hydroxypropyl ester), glycerol, trimethylolethane, trimethylolpropane and/or trimethylolbutane.

The individual components A, B, and C are optionally provided in one or more of several weight percentages. Optionally amounts of component A are such that the content of double bonds that can undergo free radical copolymerization is between 0.5 and 6.0, optionally between 1.0 and 5.5, optionally between 1.5 and 5.0 mol/kg of non-aqueous constituents of the dispersion.

Component B is included at 5-75, optionally 10-50, and optionally 15-40 weight percent of the overall material.

Urethane acrylate resin is optionally provided with a second crosslinking agent. A second crosslinking agent optionally includes one or more polyisocyanates chosen from the group of aromatic, araliphatic, aliphatic or cycloaliphatic polyisocyanates or mixtures of such polyisocyanates. Suitable polyisocyanates are, for example, 1,3-cyclohexane-diisocyanate, 1-methyl-2,4-diisocyanato-cyclohexane, 1-methyl-2,6-diisocyanato-cyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, α,α,α,α'-tetramethyl-m- or -p-xylylene-diisocyanate, 1,6-hexamethylene-diisocyanate, 1-isocyanato-3,3,5-trimethyl-5-isocyanatomethylcyclohexane (isophorone-diisocyanate or IPDI), 4,4'-diisocyanato-dicyclohexylmethane, 4-isocyanatomethyl-1,8-octane-diisocyanate (triisocyanatononane, TIN) (EP-A 928 799) and mixtures thereof. Homologues and oligomers of these polyisocyanates listed with biuret, carbodiimide, isocyanurate, allophanate, iminooxadiazinedione and/or uretdione groups, mixtures thereof with one another and mixtures with the polyisocyanates listed above are likewise suitable. 1,6-Hexamethylene-diisocyanate, 1-isocyanato-3,3,5-trimethyl-5-isocyanatomethylcyclohexane (isophorone-diisocyanate or IPDI) and 4,4'-diisocyanato-dicyclohexylmethane and mixtures thereof with one another are preferred. Homologues and oligomers of 1-isocyanato-3,3,5-trimethyl-5-isocyanatomethylcyclohexane (isophorone-diisocyanate or IPDI) and 4,4'-diisocyanato-dicyclohexylmethane with biuret, carbodiimide, isocyanurate, allophanate, iminooxadiazinedione and/or uretdione groups, mixtures thereof with one another and mixtures with the preferred polyisocyanates listed above are likewise preferred.

Other materials are optionally included in an aqueously dispersed urethane acrylate resin such as those described in U.S. Patent Publication No. 2012/0041145.

An optional aqueously dispersed urethane acrylate resin that can optionally be used in the present invention is sold under the name of Bayhydrol XP 2690 and is available from Bayer Materials Sciences, Pittsburgh, Pa.

In some embodiments, the urethane acrylate resin is present at less than 50% by weight of the total resin (e.g. total weight of the hydroxyl functional polyurethane resin and the aqueously dispersed urethane acrylate resin), optionally between 10% and 50% or any value or range therebetween. The urethane acrylate resin is optionally present at from 20% to 45%, optionally from 35% to 40% by weight of the total resin. It was unexpectedly discovered that the presence of a relatively low amount of acrylate resin promotes curing of the entire composition upon exposure to UV light even though the UV curable portion of the material is in the minority. Prior to experimental curing, it was believed that the presence of the acrylate resin would enhance the hardness of the material after the UV curing time, but full or otherwise functional hardness would not be achieved until proper curing of the ambient cure material by full reaction with the a crosslinker such as a polyisocyanate. Of greater surprise was the realization that promoting the cure of the hydroxyl functionalized material such as by the addition of heat, without UV light, resulted in a material that failed to cure even though the ambient cure resin material is at a relative majority. The material resulting from heat curing absent UV light was of such poor hardness and incomplete cure that hardness or solvent resistant testing (traditional test for cure level) were not able to be performed.

A low observable coating composition includes one or more (e.g. a plurality) of low solar absorbing pigments. It was discovered that not all pigments are suitable for inclusion in a coating composition as claimed herein. A low solar absorbing pigment has properties that do not interfere with radiation in the UV spectrum thus allowing the UV radiation to be available to activate the photo-initiation process necessary for cure of the UV curable urethane acrylate resin. Thus, a low solar absorbing pigment must meet two criteria for use. First, the material must be low solar absorbing to impart low observability to the resulting coating material in the visual and near IR bands. Second, the pigment must not interfere with activation of the photoinitiator required for UV cure.

Illustrative examples of low solar absorbing pigments include, but are not limited to, certain metal oxides including one or more guest components that preserve the crystalline structure, charge, and cation sites of the host component lattice structure. Illustrative examples of metal oxides include, but are not limited to, those that have a corundum-hematite crystalline structure, illustratively iron or chromium. A guest component is illustratively aluminum, antimony, bismuth, boron, chrome, cobalt, gallium, indium, iron, lanthanum, lithium, magnesium, manganese, molybdenum, neodymium, nickel, niobium, silicon, tin, titanium, vanadium, zinc, or combinations thereof. These and other examples of low solar absorbing pigments are described in U.S. Pat. No. 6,454,848.

A low solar absorbing pigment is a pigment that will provide chroma, hue and saturation for a camouflage green, black, tan, or other desired color. For example, chrome oxides are optionally used in a camouflage green to simulate the chlorophyll reflectance curve detected in the near-infrared region. Iron oxides may be used to impart a visual brown color to the resulting composition. Illustrative specific examples of a low solar absorbing pigment may be described in U.S. Pat. No. 6,454,848. Illustrative specific examples of pigments include, but are not limited to, chromium oxide, magnesium ferrite ($MgFe_2O_4$), red iron oxide ($Fe_2O_3$), black iron oxide ($Fe_3O_4$), zinc ferrite ($ZnFe_2O_4$), and combinations thereof. Specific examples of low solar absorbing pigments include, but are not limited to, chromium oxide (e.g. Chromium Oxide Green (GX-1005 or G-8599), zinc ferrite (e.g. Tan-20-A), red iron oxide ($Fe_2O_3$) (e.g. Red Iron Oxide 2199-D), black iron oxide ($Fe_3O_4$) (e.g. V-775 Cool color IR Black), and combinations thereof.

The resulting pigmentation can be optionally changed or altered to account for specific camouflage applications and/or scenarios as desired. Exact chroma, hue, saturation and other characteristics of the respective colors may be found in the military specification entitled: Coating Aliphatic Polyurethanes, Chemical Agent Resistant MIL-C-46168D (ME), 21 May 1987, listed in Section 1.2.1 Colors, and more definitely in Table V titled Pigmentation; and throughout MIL-DTL-64159 and particularly Tables I and III-VI.

A low solar absorbing pigment is present in an amount sufficient to provide low observability to an article coated with the composition. Illustratively, a low solar absorbing pigment is preset at 0.1 to 40 wt percent of the composition. It is appreciated that the amount of low solar absorbing pigment is dependent on the desired final color or other spectral characteristics of the resulting composition.

A water dispersible low observable curable composition may include one or more additional materials to adjust the flow, settling, adhesion, dispersion, defoaming, photoinitiation, or other characteristic of the composition.

A photoinitiator is optionally any molecule sufficient to effect free radical polymerization of (meth)acrylate double bonds for polymerization induced by radiation chemistry. Illustrative examples include, but are not limited to, those suitable for promoting curing at a wavelength of less than 400 nm, such as mediated by UV, electron, x- or gamma rays. UV radiation is particularly preferred in the presence of one or more photoinitiators. A distinction is made in principle between two types of photoinitiators: the unimolecular (type I); and the bimolecular (type II). Suitable (type I) systems are aromatic ketone compounds, such as e.g. benzophenones in combination with tertiary amines, alkylbenzophenones, 4,4'-bis(dimethylamino)benzophenone (Michler's ketone), anthrone and halogenated benzophenones or mixtures of the types mentioned. (Type II) initiators, such as benzoin and its derivatives, benzil ketals, acylphosphine oxides, 2,4,6-trimethyl-benzoyl-diphenyl-phosphine oxide, bisacylphosphine oxides, phenylglyoxylic acid esters, camphorquinone, α-aminoalkylphenones, α,α-dialkoxyacetophenones and α-hydroxyalkylphenones are also suitable. Photoinitiators that are readily incorporated into aqueous coating compositions are preferred. Such products include, but are not limited to, Irgacure® 500 (a mixture of benzophenone and (1-hydroxycyclohexyl)phenyl ketone, Ciba, Lampertheim, DE), Irgacure® 819 DW (phenyl-bis-(2,4,6-trimethylbenzoyl)-phosphine oxide, Ciba, Lampertheim, DE) and Esacure® KIP EM (oligo-[2-hydroxy-2-methyl-1-[4-(1-methylvinyl)-phenyl]-propanone], Lamberti, Aldizzate, Italy). Mixtures of these compounds can also be employed. A photoinitiator is optionally present at 0.5-2.0 weight percent, optionally from 1-3 weight percent.

A water dispersible low observable curable composition optionally includes a supplementary crosslinking agent as a part (ii) that is optionally a water dispersible polyisocyanate in addition to any isocyanate material included in either an aqueously dispersed hydroxyl functional polyurethane resin or an aqueously dispersed urethane acrylate resin. Illustrative examples of a supplementary polyisocyanate include, but are not limited to, the polyisocyanates described in U.S. Pat. No. 5,200,489. A supplementary crosslinking agent is optionally present from 4 to 55 weight percent.

A water dispersible low observable curable composition optionally includes one or more flattening agents such as polymeric beads. Illustrative examples of polymeric beads include beads made of polyurea or polyurethane, optionally with a median particle size of 18 µm. Beads are optionally spherical vesiculated type materials with enhanced matting properties and are extremely chemical resistant. A flattening agent is optionally present at from 5-15% weight percent, optionally 5-10 weight percent, optionally 7-9 weight percent.

A water dispersible low observable curable composition optionally includes one or more pigment dispersing aids. A pigment dispersing aide is optionally preset at from 0.1 to 1 weight percent or other amount as is suitable. Illustrative examples of a pigment dispersing aid include, but are not limited to, the polymeric dispersants such as those sold under the tradename SOLSPERSE 20000 sold by Lubrizol Advanced Materials Inc., Wickliffe, Ohio, and Troysol AFP from Troy Corp., Florham Park, N.J.

A water dispersible low observable curable composition optionally includes one or more defoaming agents. A defoaming agent is suitable for use as an agent for aqueous dispersions. A defoaming agent is optionally a silicone or silicone free system. When present, a defoaming agent is optionally included at 0.1 to 1.0 percent by weight percent, optionally 0.1 to 0.5 weight percent, optionally 0.1 to 0.3 weight percents Illustrative examples include, but are not limited to, the defoaming agents sold as BYK 023 available from BYK USA Inc., Wallingford, Conn.

The coatings can optionally contain other additives and raw materials including, but not limited to, catalysts, surfactants, adhesion and crosslinking agents, flow and wetting agents, solvents (e.g. water etc.), thickening agents, suspension agents, strength enhancing agents and so forth. The coatings can be applied to any substrate such as metal, plastic, wood, glass, etc. Additives are included at levels understood by those of skill in the art to impart the desired characteristics.

An overall illustrative composition according to some embodiments is depicted in Table 1.

TABLE 1

| Ingredient | wt. % |
|---|---|
| hydroxyl functional polyurethane | 10-50 |
| urethane acrylate resin | 10-50 |
| Photo-initiator | 0.5-2.0 |
| Defoaming agent | 0-1.0 |
| Pigment Dispersing Aid | 0.5-2.0 |
| low solar absorbing pigment | 0.1-40 |
| Antisettling agent | 0-1 |
| HDPE emulsion | 2-15 |
| Matting Agent | 0-15 |
| Flow and Wetting Agent | 0-1 |
| Adhesion and Crosslinking Agent | 0-4 |
| Water | 5-50. |

It is appreciated that other additives may be present as is determined beneficial by one of skill in the art.

Various aspects of the present invention are illustrated by the following non-limiting examples. The examples are for illustrative purposes and are not a limitation on any practice of the present invention. It will be understood that variations and modifications can be made without departing from the spirit and scope of the invention. A person of ordinary skill in the art readily understands where any and all necessary reagents may be commercially obtained.

EXAMPLES

Example 1

Manufacture of Water Dispersible Low Observable Curable Compositions

Water dispersible low observable compositions are formulated as a combination of two master mixes with Master Mix A formulated as in Table 2 using various amounts and pigment types.

TABLE 2

| | A<br>LSA 808<br>Green<br>wt. % | B<br>LSA 37030<br>Black<br>wt. % | C<br>LSA Tan<br>686A<br>wt. % |
|---|---|---|---|
| Weigh into a stainless steel beaker. | | | |
| Bayhydrol XP7110 | 21.23 | 23.74 | 21.23 |
| Bayhydrol XP2690 | 14.15 | 15.82 | 14.15 |
| BYK-023 | 0.15 | 0.17 | 0.41 |
| Troysol AFP | 0.38 | 0.43 | 0.23 |
| Solsperse 20000 | 1.15 | 1.29 | 1.82 |
| Weigh out powders and add to A with slow mixing | | | |
| Titanium Dioxide (TR-93) | | | 15.06 |
| Black Iron Oxide V-775 LSA | | 21.08 | |
| V-12650 LSA | 22.80 | | 1.39 |
| Tan-20-A | 3.20 | | |
| Yellow Oxide YLO 3288D | | | 3.02 |

TABLE 2-continued

| | A<br>LSA 808<br>Green<br>wt. % | B<br>LSA 37030<br>Black<br>wt. % | C<br>LSA Tan<br>686A<br>wt. % |
|---|---|---|---|
| Red Iron Oxide 2199-D | 0.57 | | 0.19 |
| Attagel 50 | 0.19 | 0.96 | 0.10 |
| Turn up mixer speed, Grind to a 6+ Hegman. | | | |
| Let down with the following while mixing | | | |
| HDPE emulsion (392N35) | 4.96 | 7.58 | 5.82 |
| DI Water | 15.70 | 12.00 | 18.80 |
| Add slowly while mixing. | | | |
| Pergopak M3 | 6.62 | 10.28 | 9.24 |
| Add remaining ingredient individually while mixing. | | | |
| Tego Glide 100 | 0.08 | 0.25 | 0.10 |
| Silquest A-189, a silane used adhesion promoter | 1.18 | 0.88 | 2.31 |
| Carbazole Violet Paste | 0.07 | | |
| 819 DW Photoinitator | 1.14 | 1.30 | 1.14 |
| DI Water | 6.43 | 4.22 | 4.99 |
| Total | 100.00 | 100.00 | 100.00 |

Master Mix B is prepared by mixing a polyisocyanate crosslinking agent with solvent and water. The NCO to hydroxyl functional polyurethane (OH) ratio can range from 1.5 to 10 or 4 to 55%.

Master Mix A and B are then combined by gentle mixing and the resulting formulation applied to a substrate and subjected to UV and ambient curing. Formulations are cured using a H & S Autoshot 1200 W UVA light held at an 8 inch or 14 inch stand-off distance (depending on the formulation) from the coated surfaces for 10 minutes. Stand-off distance of the UVA lamp and duration of UVA exposure can be varied depending on desired degree of cure. Coatings are ready to handle within ten minutes of spraying compared to 6-8 hours required for current ambient cure CARC and exhibits MEK resistance within 24 hours compared to approximately 7 days required for ambient cure CARC.

Additional formulas are prepared as in Table 2 using various ratios of aqueously dispersed hydroxyl functional polyurethane resin (e.g. Bayhydrol XP7110) and an aqueously dispersed urethane acrylate resin (e.g. Bayhydrol XP 2690) as listed in Table 3.

TABLE 3

| Formula | hydroxyl functional polyurethane resin | urethane acrylate resin |
|---|---|---|
| D | 35 | 5 |
| E | 43 | 11 |
| F | 35 | 10 |
| G | 30 | 10 |
| H | 30 | 12 |
| I | 38 | 16 |
| J | 25 | 15 |
| K | 25 | 17 |
| L | 25 | 20 |
| M | 20 | 20 |
| N | 32 | 22 |
| O | 20 | 25 |
| P | 15 | 25 |
| Q | 15 | 27 |
| R | 15 | 30 |
| S | 10 | 30 |
| T | 10 | 32 |
| U | 10 | 35 |
| V | 5 | 35 |
| W | 5 | 37 |
| X | 5 | 40 |

Each of Formulas D-X demonstrate excellent dry and handling characteristics similar to Formulas A-C. Formulas F-O show particularly superior dry and handling characteristics.

Example 2

Substrate Coating and Coating Performance

Formulations A-X are prepared as in Example 1 and coated onto cold rolled steel pretreated with zinc phosphate coating Bonderite® 952 and sealed with Parcolene® 60 chrome sealer. These panels are 0.032 inches (0.8128 mm) thick. For flexibility tests, tinplated steel panels (0.010 inches (0.254 mm) thick) are used. The panels are coated by spraying with each formulation unless otherwise noted.

Immediately after the coating is applied, the coated panels are placed in a spray booth for 10 minutes to allow flash off of water and solvent and then placed under the UVA lamp for curing. The UVA lamp used to cure the panels is a H & S Autoshot 1200 W UVA light held at an 8 inch or 14 inch stand-off distance (depending on the formulation and specified in the discussion) from the paint surfaces. Panels are exposed to the UVA light for 10 minutes.

The coated panels are subjected to a series of tests as per Table 4 and MIL-DTL-53072D paragraph 4.2.3.2 "Solvent Wipe."

TABLE 4

| Test | ASTM Method |
|---|---|
| Color & Reflectance | E308 & E1331 |
| Specular Gloss | D523 |

TABLE 4-continued

| Test | ASTM Method |
|---|---|
| Adhesion | D3359 |
| Water Resistance | MIL-DTL-64159 Para 4.4.20 |
| Hydrocarbon Resistance | MIL-DTL-64159 Para 4.4.21 |
| Blistering | D714 |
| UV Accelerated Weathering | G154, G151, D4587 |
| Xenon Accelerated Weathering | SAE J1969/J2527 |
| Flexibility | D522 |
| Drying Time | D5895 |
| MEK Resistance | D5402-6 |
| Pencil Hardness | D3359 |
| Pendulum Hardness | D4366 Konig Method |

Drying results for ambient cure and UV activated CARC is shown in Table 5 comparing traditional CARC of U.S. Pat. No. 5,691,410 (Ambient Cure CARC). Drying is monitored between 15 minutes and 300 minutes following removal of the panels from the UV lamp. Designations of different dry characteristics are given based on criteria listed in ASTM D 5895-03 Reapproved 2008 "Evaluating Drying and Curing." The designations are as follows: SST-set to touch: light finger pressure does not leave imprint—DH-dry hard: forcible pinch does not leave imprint—DT-dry through: press and twist using thumb does not leave imprint.

Ambient cure water dispersible CARC requires 72 hours for DT properties and 7 days for final cure. Therefore, the results shown in Table 5 (CARC air dry) are expected in that the ambient cure CARC remained wet for over two hours and did not achieve STT for 4 hours. Even after 4 hours, the coating remained very soft and could not be handled without damage to the coating surface. When ambient cure CARC is placed under the UV lamp for 10 minutes it's drying is accelerated and the STT property is observed after 45 minutes. After about 3 hours, the coating exhibited dry properties.

All three UV activated coatings exhibited STT properties within 15 minutes of removal from the UV lamp. Thus the UV cure coatings exhibit an accelerated dry time compared to the ambient cure CARC. UV4 exhibited a complete dry within 45 minutes. UV2 was not monitored beyond three hours and did not achieve a complete dry time within three hours. UV3 was not monitored beyond 90 minutes and although it was almost completely dry, it did not achieve DH status within that time. Drying results are illustrated in Table 6.

TABLE 5

Panel Test Results for Formulas E (UV2), I (UV3) N (UV4) and CARC with UV were exposed to UV cure using 14 inch Lamp Stand-off Distance wherein CARC is a formulation of U.S. Pat. No. 5,691,410.

| Test | MIL-DTL-64159 Requirement | CARC air dry | CARC with UV exposure | UV2 | UV3 | UV4 |
|---|---|---|---|---|---|---|
| Flexibility ASTM D 522/B ¼ in mandrel | No Cracks/flaking | Pass | Pass | Pass | Pass | Pass |
| Flexibility after 7 day H2O immersion ¼ in mandrel | No Cracks/flaking | Pass | Pass | Pass | Pass | Pass |
| Blistering ASTM-D 7114 | 10 Rating Maximum | 10 | 10 | 10 | 10 | 10 |
| Blistering after 7 day H2O immersion | | 10 | 10 | 10 | 10 | 10 |
| Cross Hatch Adhesion ASTM-D 3359 | 4B Rating Minimum | 5B | 5B | 5B | 5B | 5B |
| Cross Hatch Adhesion After 7 day H2O immersion | | 5B | 5B | 5B | 5B | 5B |
| Pencil Hardness ASTM D 3359 | 8H Rating Maximum | 8H | 8H | 8H | 8H | 8H |
| Pencil Hardness After 7 day H2O immersion | | 8H | 8H | 8H | 8H | 8H |
| Gloss 60°/85° ASTM D 532 | 60° 1.0 Max 80° 3.5 Max | 1.3/2.4 | 1.8/2.1 | 2.5/3.4 | 3.4/5.3 | 2.7/4.3 |
| Gloss 60°/85° After 7 day H2O immersion | | not tested | 1.8/2.7 | 2.6/3.7 | 3.4/3.8 | 2.9/4.1 |

TABLE 6

Dry times recorded following 10 minutes of flash off in spray booth and after 10 minutes of UVA exposure at a 14 inch lamp stand-off distance.

| Sample | 15 min. | 30 min. | 45 min. | 60 min. | 90 min. | 120 min. | 180 min. | 240 min. | 300 min. |
|---|---|---|---|---|---|---|---|---|---|
| Ambient cure WD CARC air dry 60% Rel. Humidity | Wet Paint easily removed with light finger pressure | Same | Same | Same | Same | Same | Tacky Finger pressure leaves light imprint | Soft but STT | Same |
| Ambient cure WD CARC with 10 minutes of UVA exposure | Soft Finger pressure leaves light imprint | Same | STT | DH | DH | DH DT | Complete Dry | | |
| UV 2 | Soft STT | Same | Same | Same | DT | DT | DT almost DH | not tested | not tested |
| UV 3 | STT | DT almost DH | Same | Same | Same | not tested | not tested | not tested | not tested |
| UV 4 | STT | DT DH | | | | Complete Dry | | | |

Dry characteristics defined according to ASTM D 5895-03 as follows:
STT-Set to touch, light finger pressure leaves no imprint
DH-Dry hard, forcible pinch does not leave imprint
DT-Dry through, press and twist using thumb leaves no imprint
Complete Dry is indicated when all three dry characteristics are met Methyl Ethyl Ketone (MEK) Resistance of 808 Green.

Dry characteristics shown in Table 6 specifically describe the dry surface characteristics of paint that can be helpful in determining sufficient drying for varying degrees of handling of a coated part, however, it does not indicate more advanced crosslinking or cure of the coating. MEK resistance is an aggressive test in which a cloth saturated with MEK is rubbed repeatedly across the surface of the coating over the same area. Rubbing across and back over the same surface for one cycle is designated as a double rub (dr). MIL-DTL-53072 criteria for this test is a minimum of 20 dr without removing paint down to the previous coated surface or bare substrate on a panel that has been allowed to cure in ambient conditions for 7 days. Table 7 shows MEK resistance after 3 hours, 24 hours, 48 hours and 7 days for UV cured coatings and standard water dispersible CARC.

TABLE 7

MEK Double Rubs (dr) according to ASTM D 5402/B
Pencil Hardness is shown before/after MEK dr
MIL-DTL-53072 requirement for MEK resistance is
50 dr @ t = 7 days ambient cure

| Dry Time | Ambient Cure WD CARC Air dry | Ambient Cure WD CARC with 10 min. UVA exposure | UV 2 | UV 3 | UV 4 |
|---|---|---|---|---|---|
| t = 3 hours | Paint Wet | Paint Dry No MEK resistance | Not tested | Not tested | 25 dr removes some but not all paint |
| t = 24 hours | 20 dr Soft HH/HB | 20 dr Becomes soft 8H/HB | 20dr 8H/3H | 20 dr MEK resistance 8H/7H | 20dr No hardness change 8H/8H |
| t = 48 hours | 100 dr 8H/3H | 100dr 8H/8H | 100 dr 8H/8H | 100 dr 8H/8H | 100 dr 8H/8H |
| t = 168 hours (7 days) | 100 dr 8H/8H | 100 dr 8H/8H | 100 dr 8H/8H | 100 dr 8H/8H | 100 dr 8H/8H |

Pencil hardness was also taken before and after the MEK rubs to determine the degree of softening following MEK exposure. Ambient cure CARC required 24 hours of dry time to perform the MEK resistance test. Although 50 dr was achieved, the sample was relatively soft and softened further to level HB after MEK exposure. After 48 hours, 100 dr was achieved on the standard CARC however, the pencil hardness decreased by 5 units (from 8H to 3H). The criteria described within MIL-DTL-64159 for immersion resistance (water and hydrocarbon) and super tropical bleach allow a decrease of no more than 2 pencil hardness units. This criterion was also used for MEK resistance. Full MEK resistance was achieved on the standard CARC after 7 day cure time. As was observed in Table 6, standard CARC placed under the UV lamp for 10 minutes exhibited accelerated drying. This formula achieved MEK resistance, maintaining pencil hardness values after 48 hours of dry time. UV2 exhibits similar values to standard CARC. UV3 and UV4 exhibit MEK resistance within 24 hours with retention of hardness values and UV4 exhibits some resistance to MEK after only 3 hours, although below specification criteria. Enhanced solvent resistance of paints is generally related to increased crosslinking within the coating. (Seo, J., 2010)

Lamp Irradiance at Various Stand-Off Distances and Exposure Times.

Curing efficiency with UV light is based on numerous factors with the parameters of the light source including wavelength, intensity and dosage of primary importance. (Strazisar, 2006) Light intensity at the coating surface, termed irradiance, is essential in order to optimize cure conditions and maintain consistency in cure results. UV lamp irradiance experiments and the effect on cure was performed. For these evaluations cure criteria was defined by pencil hardness and MEK resistance, both measurements taken within minutes following 10 minutes of UV irradiation. Lamp intensity measurements at the coating surface were taken using a Solarlight PMA 2100 radiometer. Results are presented in Table 8.

TABLE 8

| Sample UV4 | UV Lamp Distance (inches) | UV Exposure Time (minutes) | UV Intensity (mW/cm$^2$) | Pencil Hardness | MEK Double Rubs (dr) ASTM-D5402 Method B Good 25-50 dr @ t = 15 min Excellent: >50 dr @ t = 15 min Spec Req: 50 dr @ t = 7 days |
|---|---|---|---|---|---|
| 808 Green | 14 | 15 | 30 | Soft | None |
| 808 Green | 8 | 5 | 74 | 5B | Good |
| 808 Green | 8 | 10 | 79 | HB | Good |
| 808 Green | 8 | 15 | 71 | HB | Excellent |
| Black | 5 | 10 | 127 | 4H | Excellent |
| Black | 8 | 10 | 74 | 3H | Excellent |
| Black | 8 | 15 | 71 | 3H | Excellent |

A stand-off distance of 14 inches with an exposure time of 15 minutes results in a low lamp intensity at the coating surface (30 mW/cm2). This irradiance level resulted in a soft coating with no MEK resistance immediately following lamp exposure. The data shown in Table 8 indicates cure development of the coatings of UV4 within minutes of UV lamp exposure thereby indicating the ability of the UV activated chemistry to achieve a relatively high degree of crosslinking in that short time. It was determined that a stand-off distance of 8 inches and an exposure time of 10 minutes, resulting in moderate lamp intensity (74 mW/cm2) resulted in sufficient hardness and MEK resistance and was used in all subsequent UV cure processes described below. It was also noteworthy that the black coating achieved significantly higher hardness compared to the 808 green suggesting that the pigmentation of the black sample exhibited less interference with the UV light, perhaps resulting in better UV cure efficiency.

Properties of UV4 Lack LSA Pigmented Coating and Standard Water Dispersible CARC.

Table 9 shows paint properties of UV4 cured at an 8 inch stand-off distance for 10 minutes under the UV lamp, compared with ambient cured CARC and standard CARC exposed to the UV lamp using the same conditions as the UV activated formulation. Pendulum hardness was measured with the BYK Gardner Pendulum Hardness Tester, Category number 5854 which is designed to test according to ASTM D4366 and ISO 1522. Pendulum hardness results using the Konig method are reported here. The Konig method uses a tapered pendulum pulled back to 6° from center (0°) and measures the number of oscillations until the pendulum is dampened to a degree of less than 3° in tandem with a calibrated timer which is controlled by the operator.

TABLE 9

| Test | CARC 10 min UV exposure Cool to RT Test Immediately | UV4 10 min UV exposure Cool to RT Test Immediately | UV4 10 min UV exposure plus Ambient Temp Test after 7 days | CARC 10 min. UV exposure plus Ambient Temp Test after 7 days | Standard CARC Black (non-LSA) Ambient cure Test after 7 days |
|---|---|---|---|---|---|
| MEK Resistance | <25 double rubs (dr) removes paint | >100 dr Minimal surface removal | >100 dr | >100 dr | >100 dr |

TABLE 9-continued

| Test | CARC 10 min UV exposure Cool to RT Test Immediately | UV4 10 min UV exposure Cool to RT Test Immediately | UV4 10 min UV exposure plus Ambient Temp Test after 7 days | CARC 10 min. UV exposure plus Ambient Temp Test after 7 days | Standard CARC Black (non-LSA) Ambient cure Test after 7 days |
|---|---|---|---|---|---|
| Pencil Hardness | Too soft to test | Softer than 3B | 6H | 6H | 6H |
| Pendulum Hardness (oscillations, seconds) | 13,21 | 29,43 | 61,89 | 56,81 | Not tested |
| Gloss 60°/85° | 0.3/1.3 | 0.3/1.7 | 0.3/1.6 | 0.3/1.4 | 0.4/1.4 |
| Flexibility ¼ in. mandrel | Pass | Pass | Pass | Pass | Pass |
| Water Immersion | Fail hundreds of blisters | Pass no blisters maintained hardness | Pass no blisters maintained hardness | Pass no blisters maintained hardness | Pass no blisters maintained hardness |
| JP8 Immersion | Pass | Pass | Pass | Pass | Pass |

All formulations utilized the same LSA black pigment package. The data in Table 9 is different from earlier data in three significant ways. It is a modified formulation based on LSA black pigments, it was cured with a shorter (8 inch) stand-off distance from the UV lamp, and testing was initiated immediately following lamp exposure and compared to samples allowed to sit at room temperature for 7 days.

The data in Table 9 shows that ambient cure CARC that had been exposed to the UVA lamp for 10 minutes and tested immediately after returning to room temperature was still soft and under cured compared to the UV4 coatings exposed to the same conditions. The ambient cure CARC was too soft to measure pencil hardness and exhibited low pendulum hardness values. The paint was easily removed from the surface when rubbed with MEK. Also, the sample failed the water immersion test exhibiting severe blistering. Although UV4 also showed soft pencil hardness, it was at least 3 pencil units harder than the CARC and the pendulum hardness was twice that of the ambient cure CARC. Also UV4 exhibited excellent MEK resistance and no blisters or change in hardness after the water immersion test. As expected, when both materials are allowed to sit for 7 days at room temperature they both see further development in properties. Particularly, hardness continues to improve over time. After the 7 day period, both coatings become indistinguishable with the exception that UV4 exhibited slightly higher hardness. Interestingly, gloss does not seem to be affected by the cure time and remained consistent for both formulations.

Artificial Weathering of CARC and UV4.

The formulations of prior used CARC and the material of UV4 are tested by artificial weathering. UV exposure testing was performed using a Q-Lab QUV/Spray instrument. Florescent bulbs were used that emitted light at 340 nm wavelength at an irradiance of 0.77 watts per square meter (W/m$^2$). This method involves alternating cycles of 8 hours light at 60° C. and 4 hours dark at 50° C. Data was taken at 300 hour intervals up to 1200 hours total.

Table 10 shows gloss and color change of CARC and UV4 as a function of weathering in the QUV chamber.

TABLE 10

| Duration | CARC 100 10 min UV exp. Cool to RT Test Immediately | | UV4 10 min UV exp. Cool to RT Test Immediately | | UV4 10 min UV exp. Plus Ambient 7 days | |
|---|---|---|---|---|---|---|
| | Gloss 60°/85° | Lab Color (ΔE*) | Gloss 60°/85° | Lab Color (ΔE*) | Gloss 60°/85° | Lab Color (ΔE*) |
| 0 hrs | 0.3/1.4 | 0 | 0.3/1.4 | 0 | 0.3/1.6 | 0 |
| 300 hrs | 0.3/1.5 | 1.83 | 0.3/1.7 | 1.19 | 0.4/1.9 | 0.60 |
| 600 hrs | 0.3/1.5 | 1.76 | 0.4/1.8 | 1.34 | 0.5/1.9 | 1.02 |
| 900 hrs | 0.3/1.6 | 1.82 | 0.4/1.9 | 1.65 | 0.4/2.2 | 1.26 |
| 1200 hrs | 0.3/1.5 | 1.6 | 0.4/2.0 | 1.9 | | |

In the 1200 hours of QUV testing both coating formulations retained gloss and color within the allowance of MIL-DTL-64159 (gloss maximum: 60°/85°: 1.0/3.5, and color change (ΔE*)<2.5 at 1000 hours of total UV irradiance. Color change in CARC that was exposed to 10 minutes of UVA radiation showed a slightly higher color change initially with a reduction in (ΔE*) after 1200 hours. The UV4 coating exhibited slightly less color change through 900 hours with an increase in (ΔE*) after 1200 hours. The coatings that were allowed to continue curing for 7 days at room temperature exhibited less color change as a result of QUV weathering. Indicating that the additional cure time allows additional crosslinking to occur in the films.

Pencil Hardness and Pendulum Hardness.

Table 11 shows pencil hardness of both UV4 and CARC exposed to 10 minutes of UVA radiation and evaluated at different time intervals following removal from the UVA lamp. Within 10 minutes following UV exposure (allowing the panels to cool enough to handle) both samples were soft. However, the CARC sample was softer than the lowest pencil value of 6B. UV4 exhibited a higher hardness value of at least 3 pencil units. UV4 hardness developed more quickly than the UV exposed CARC sample, and the two coatings exhibited the same hardness values after about 72 hours. Full hardness values were achieved after 7 days.

TABLE 11

| | Time following UV lamp exposure | | | | | | |
|---|---|---|---|---|---|---|---|
| Sample | <10 min | 1 hr | 2 hr | 3 hr | 20 hr | 72 hr | 7 days |
| CARC LSA Black with 10 min. UV exposure | <6B | <6B | <6B | <6B | 3B | H | 6H |
| UV4 | <3B | 3B | HB | HB | F | H | 6H |

Pendulum hardness values were also measured and are shown in Table 12. With this technique the hardness of a coated surface is measured by tracking the dampening effect the coated surface has on an oscillating pendulum. This method consists of placing two stainless steel balls on the coated surface. The balls act as the pivot point at the top of a pendulum. The pendulum is swung from a fixed start position and the number of swings is counted. Softer surfaces will dampen more quickly and thus swing fewer times. The oscillations and seconds measured are taken as the hardness of the coating.

TABLE 12

| | Time following UV lamp exposure | | | | | |
|---|---|---|---|---|---|---|
| Sample | <10 min. | 2 hr | 24 hr | 48 hr | 14 days | months |
| CARC LSA Black coated on steel, with 10 minutes UV lamp exposure | 13,21 | 15,23 | 23,35 | 43,62 | 56,82 | — |
| UV4 | 29,43 | 28,42 | 46,66 | 53,76 | 66,95 | — |
| Standard CARC Black (non-LSA no UV exposure) | — | — | — | — | — | 70,101 |

The trend in pendulum hardness is similar to that seen for pencil hardness. Both coatings continue to develop hardness over time, however, UV4 exhibits significantly higher hardness values following UVA radiation exposure. Pendulum hardness of standard black ambient cure CARC that was several months old was tested for comparison. This CARC sample represents a fully cured coating. UV4 exhibits similar pendulum hardness as the control after 14 days. Asif et al. report that pendulum hardness is related to crosslink density and inter-chain interactions within polyurethane networks. (Asif, 2005) Thus, the accelerated development of pendulum hardness seen for UV4 suggests that the UV cure formulation has higher crosslink density soon after UVA exposure compared to the CARC coating which correlates with the MEK resistance and enhanced drying characteristics observed for the UV cure formulation.

Dynamic Mechanical Analysis (DMA).

Mechanical properties of the coatings of various formulations were measured using a DMA 2980 Dynamic Mechanical Analyzer (TA Instruments). DMA measures the viscoelastic response of polymers under a small cyclic strain with respect to temperature. The sensitivity of the viscoelastic response of polymers makes this a good technique to elucidate structure property relationships of the polymer. (Neag, 1995) A fully formulated paint with pigments and additives is a complex system that can convolute the viscoelastic response. To simplify the system and to ascertain contributions from polymer chain interactions on the viscoelastic properties, unfilled "clear" coatings were used for DMA. These clear compositions for testing are formulated as in Table 13.

TABLE 13

| Non-Pigmented Formulation | Indexing (NCO:OH) of 5:1 (grams) | Wt % |
|---|---|---|
| CARC : | | |
| Hydroxyl Functional Polyol | 100 | 35.7 |
| Polyisocyanate | 133.2 | 47.6 |
| Water | 46.6 | 16.7 |
| Total | 279.8 | 100.0 |
| UV2: | | |
| Hydroxyl Functional Polyol | 80 | 32.6 |
| Water Dispersible Polyurethane Acrylate | 20 | 8.1 |
| Photoinitiator (819DW) | 1.6 | 0.7 |
| Polyisocyanate | 106.5 | 43.4 |
| Water | 37.3 | 15.2 |
| Total | 245.5 | 100.0 |
| UV3: | | |
| Hydroxyl Functional Polyol | 70 | 30.7 |
| Water Dispersible Polyurethane Acrylate | 30 | 13.1 |
| Photoinitiator (819DW) | 2.4 | 1.1 |
| Polyisocyanate | 93.2 | 40.8 |
| Water | 32.6 | 14.3 |
| Total | 228.3 | 100.0 |
| UV4: | | |
| Hydroxyl Functional Polyol | 60 | 28.4 |
| Water Dispersible Polyurethane Acrylate | 40 | 18.9 |
| Photoinitiator (819DW) | 3.2 | 1.5 |
| Polyisocyanate | 79.9 | 37.9 |
| Water | 28.0 | 13.3 |
| Total | 211.1 | 100.0 |

A film clamp adapter was calibrated according to the TA instruments calibration routine. Once mounted in the tension film clamp, samples were equilibrated at −20° C. for 5 min followed by a programmed temperature ramp from −20 to 180° C. at 2° C./min using a constant oscillatory frequency of 1 Hz.

Figure 2:
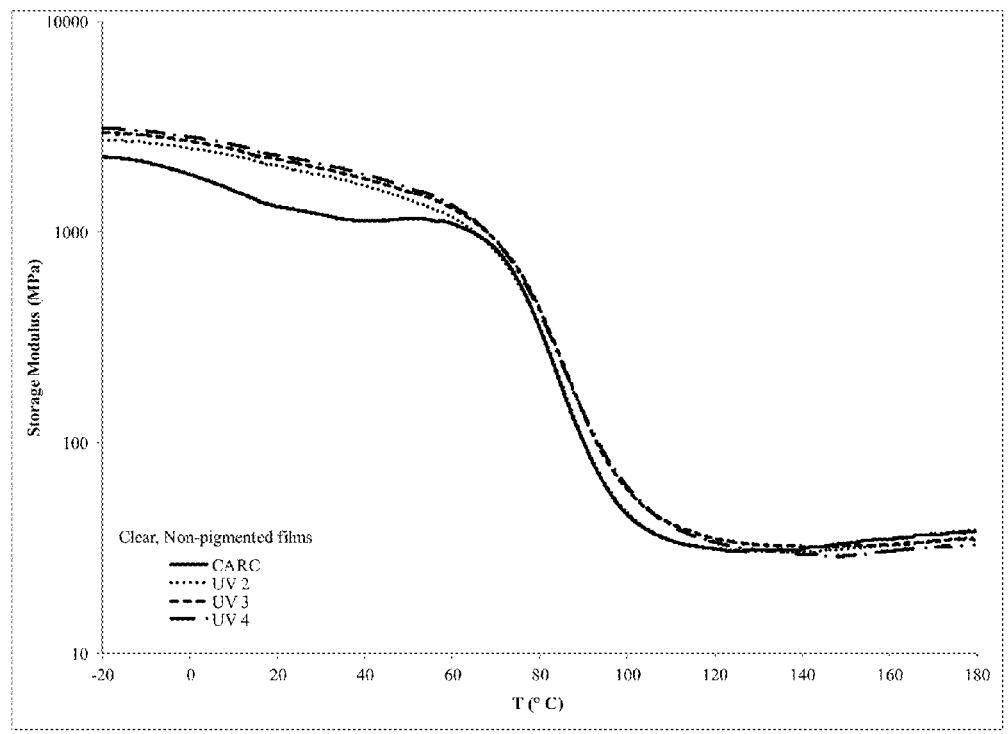
FIG. 2 illustrates dynamic mechanical analysis of a coating according to one embodiment using unpigmented material demonstrating storage modulus 7 days following lamp exposure.

The results of DMA testing are presented in FIGS. 1-4. FIGS. 1 and 2 illustrate the storage modulus for clear films of Table 13 after 2 days following coating application and 7 days following coating application, respectively. For these experiments, unsupported "free films" were used. The UV cure samples were cured using UV light as explained earlier in the report. However, the CARC samples prepared for the DMA experiment were not exposed to UV light and instead allowed to cure according to the standard ambient cure process. A minimum of 2 days was required for the CARC coatings to have adequate film properties to be removed from the substrate a free films.

Storage modulus (E') is associated with energy stored in the material as a result of the applied strain and is related to the material stiffness. E' can provide information related to molecular weight, degree of cure and crosslink density. (Asif, 2005, Skrovanekek, D. 1988) The DMA data show a marked difference between the UV cure coatings and ambient cure CARC particularly after 2 days following coating application. The three UV cure formulations UV2, UV3, and UV4) show a higher E' compared to ambient cure CARC indicating a higher crosslink density and greater degree of cure than the CARC sample. After 7 days following coating application, E' for all four coatings exhibit similar values but the greatest change is seen in the standard CARC coating which showed a significant improvement in E' across in both the glassy and rubbery plateau regions. This is direct confirmation that the ambient cure CARC requires 7 days for full development of crosslink density and that the UV cure formulations achieve crosslink density and greater degree of cure much sooner following coating application. Even after 7 days, E' is lower for the ambient cure CARC in the glassy region of the curve.

Figure 3:
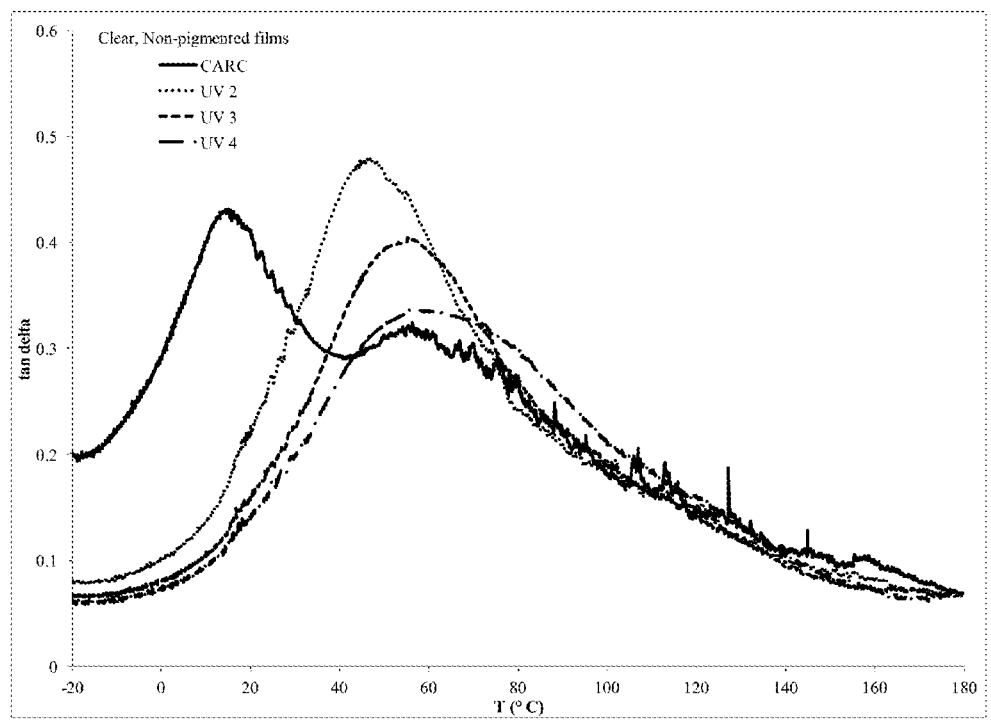
FIG. 3 illustrates tan δ of a coating according to one embodiment using unpigmented material 2 days following lamp exposure.
Figure 4:
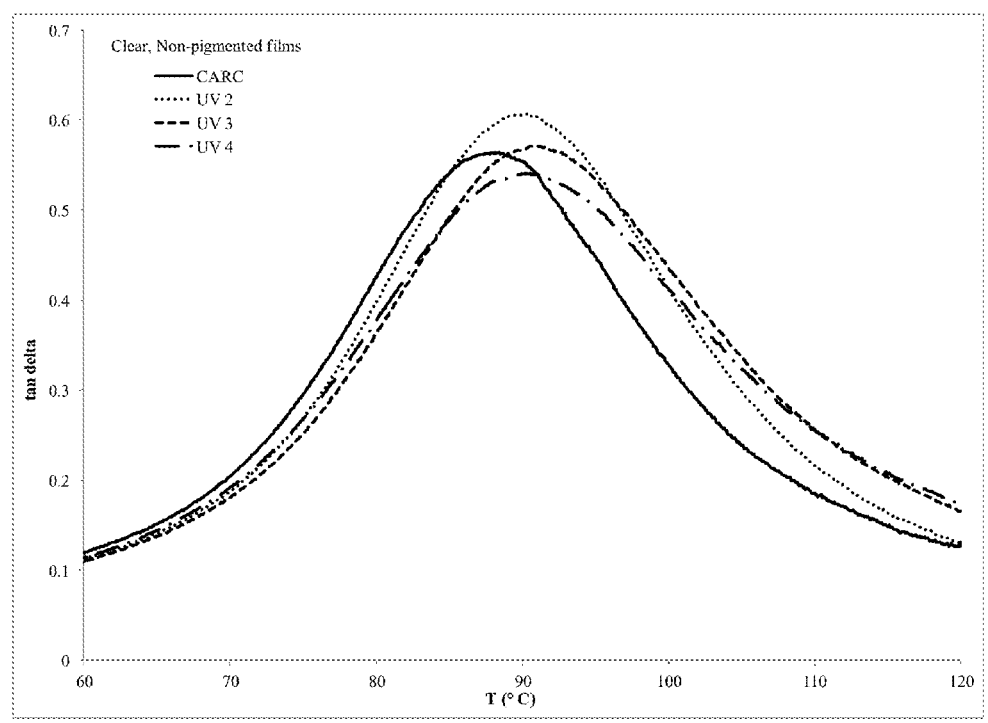
FIG. 4 illustrates tan δ of a coating according to one embodiment using unpigmented material 7 days following lamp exposure.

Tan delta (tan δ), the ratio of loss modulus to storage modulus (E"/E'), is shown in FIGS. 3 and 4. The temperature associated with the peak magnitude of tan δ is defined as the glass transition temperature $T_g$. Height and width of tan δ peaks are related to structural homogeneity and crosslink density. (Koleske, 2012) The tan δ curves shown in FIG. 3 reflect significant differences between the four coatings 2 days following coating application. The UV cure coatings exhibited increasing $T_g$, reduction in peak magnitude and increased broadening with respect to increasing UV component in the formulation. The $T_g$'s for UV2, UV3, and UV4 were 46.2° C., 54.5° C. and 60.2° C. respectively. As the relative degree of crosslinking increases in a sample, the free volume and mobility of chain ends decrease resulting in an increase in $T_g$. (Skrovanek, 1988) Thus, crosslinking increases in the UV cure coatings as a function of increasing UV component after 2 days following coating application. Tan δ peak broadening was also observed with increasing UV activated chemistry. Broad $T_g$ regions are generally indicative of molecular heterogeneity arising from contributions of multiple reactions. (Skrovanek, 1988) Introduction of crosslinks also reduces tan δ (peak magnitude) and increases peak width. (Kolske, 2012) Tan δ of UV4 in particular indicates a greater degree of crosslinking compared to standard CARC indicating a more advanced state of cure at a time of 2 days following sample preparation. Standard water dispersible CARC following 2 days of ambient cure time is clearly under cured as reflected in the 2 distinct transitions at 14.5° C. and 55.8° C. Prior work by Crawford and Escarsega showed that tan δ for standard CARC exhibited a single well defined peak with a $T_g$ of 73° F. measured 10 days post cure. (Crawford, 2000).

FIG. 4 shows tan δ data for the four coatings after 7 days following coating application. After 7 days, the four coatings exhibit narrow well defined peaks and similar $T_g$'s (CARC 87.8° C., UV2 89.7° C., UV3 90.6° C., UV4 90.6° C.). The tan δ data following 7 days post application confirm earlier DMA for water dispersible CARC that 7 days of ambient cure are required for that formulation. The data show that the viscoelastic properties of the UV cure samples closely resemble standard ambient cure CARC after about a week post cure, which correlates with the similar physical properties measured for both formulations after that time period. However, the tan δ data following 2 days after coating application also show that the cure process for the two systems proceeds at significantly different rates in the early stages of cure and likely follow different mechanisms indicated by the very different viscoelastic responses. The properties of MEK resistance, hardness and blistering (water immersion) are distinctly different for the standard CARC and UV cure samples within minutes of UVA irradiation, suggesting that the two cure mechanisms vary significantly immediately following lamp exposure.

FTIR of UV Cure Formulation with Respect to Cure Time

The kinetics of the UV-initiated reaction in non-pigmented thin films on a ZnSe crystal was monitored using the ATR-FTIR spectroscopy. These studies were performed using a Nexus 870 (Thermo-Nicolet) FTIR modified with a Gateway ATR accessory (Specac). The bench was allowed to purge with dry nitrogen for 10 minutes prior to collecting a background spectrum of the ZnSe crystal mounted in the accessory. Polymer films were cast onto the crystal by placing a drop at one end of the crystal, tilting the top plate of the accessory nearly normal to the benchtop, and allowing the drop to run across the surface of the entire crystal. Excess polymer was wiped from the trough plate assembly and the plate was quickly placed onto the ATR accessory through the sliding window in the FTIR sample compartment. The spectrum was the summation of 32 scans collected between 650 and 4000 $cm^{-1}$ at 2 $cm^{-1}$ resolution.

Figure 5:
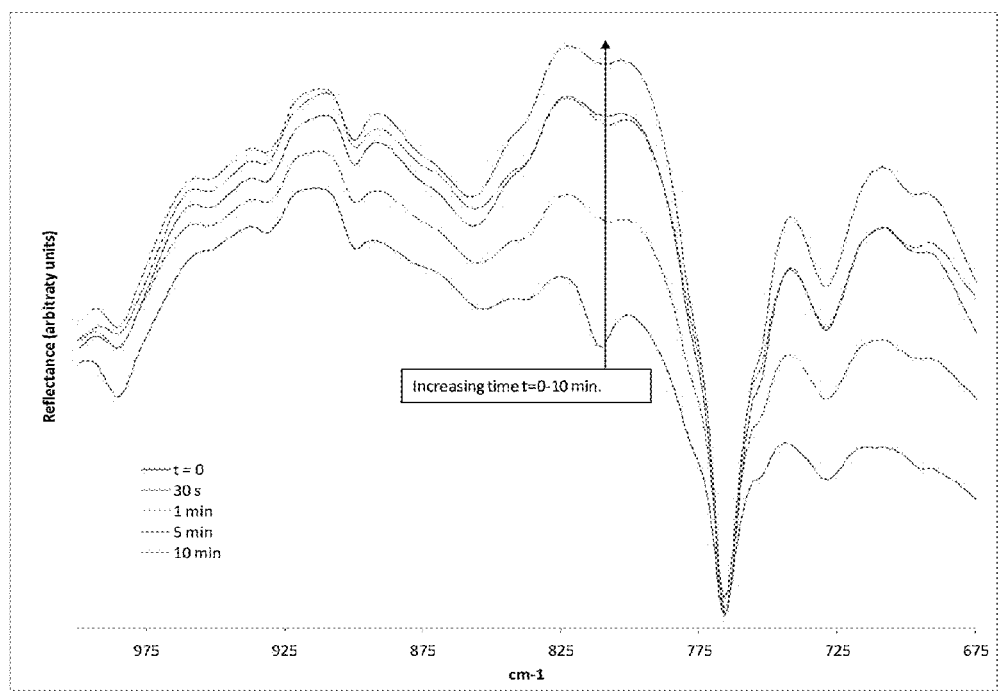
FIG. 5 illustrates FTIR of UV cured compositions according to one embodiment using unpigmented material with respect to cure time.

These data are collected using compositions representative of Formulations A-X that were cast from a blend of ambient cure polyol material, isocyanate, and UV-curable component. The spectra collected were normalized to the C—H stretch at 2928 $cm^{-1}$. As seen in FIG. 5, a decrease in the C=C stretching band at 810 $cm^{-1}$ at different UV-exposure times indicates a reaction between the acrylate end-groups and the photoinitiator near the interface of the thin polymer film and the crystal surface indicating that the UV initiated cure is proceeding. There is an obvious decrease in the intensity of the acrylate C=C peak after only 30 seconds of exposure time. The intensity of the C=C peak does not decrease significantly with longer exposure times and does not completely disappear from the spectrum exposed for 10 minutes to UV radiation. Without being limited to one particular theory, the remaining acrylate functionality may be due to a decrease in mobility of the acrylate terminus and/or photoninitiator as the cross-linking reaction proceeds. Likewise, the concentration of photoinitiator in the region probed by ATR-FTIR may also be depleted. Depth profile experiments performed by van der Berg also showed residual C=C using ATR-FTIR for UV curable polyurethanes exposed to 10 minutes of UVA irradiation. (van der Berg, 2008) Yang et. al used real time FTIR to show that C=C conversion increases rapidly within the first 1-2 minutes of the coatings exposure to UV light. (Yang, 2010) Both papers confirm our findings of acrylate double bond conversion as a result of UV cure.

Reflectance

All camouflage coatings use a mixture of mixed metal oxides to impart color and provide camouflage properties. The current 383 camouflage green uses a combination of chrome oxide and cobalt spinel to both replicate foliage background in the visible (400 nm-700 nm) and in the near IR spectra (750 nm-900 nm). The standard black formulation utilizes a combination of black iron oxide and/or carbon black to impart color. The reflectance spectra for these coatings are shown in FIG. 7. Standard black has very low reflectance of approximately 4% across the entire spectrum. Standard green 383 has low reflectance (~15%) in the region of 1300-1700 nm. Additionally, cobalt spinel is a foreign import with significant cost increases (>300%) in recent years, and cobalt it is in free form has been identified as a hazardous air pollutant (HAP) by the Environmental Protection Agency (EPA) warranting initiatives to reduce or eliminate it.

The long term stability of camouflage coatings is directly related to the degree of exposure to sunlight, temperature extremes and humidity. The amount of solar absorption that a surface is subject to is directly related to the reflectivity of the coating system in both the visible and the near IR region of the spectrum. To lower the solar absorption in the non visible IR, pigment and nanometer scale additives to the color formulations have been developed. The low reflectance values of the standard pigmented coatings shown in FIG. 6 indicate the high solar loading that coatings with these pigments impart.

Figure 6:
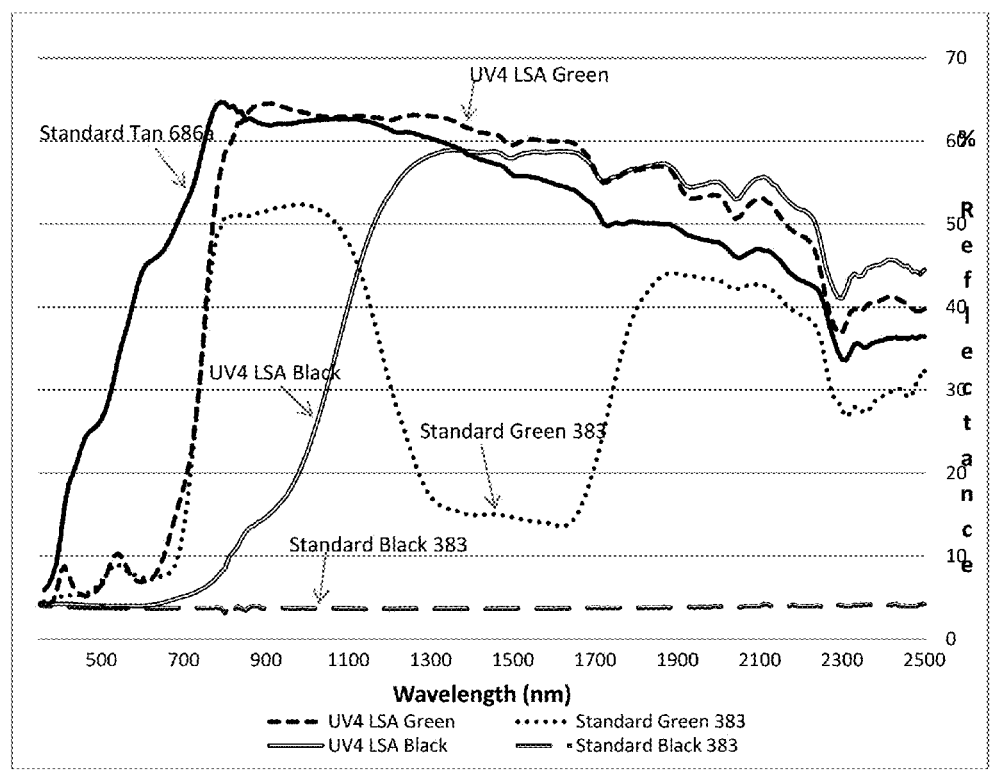
FIG. 6 illustrates reflectance of certain embodiments of the provided compositions.

Reflectance values for the UV4 formulation, utilizing LSA pigments for both black and green are also shown in FIG. 6. The UV cure formulations exhibited significantly higher reflectance values in the near IR region of 700 to 1000 nm where half of the solar loading occurs. Reflectance values in that region increased from approximately 50% to 64% for the green formulations and from 4% up to 20% for the black pigmented coating as measured by a Varian 5000 Spectrophotometer with an integrated sphere. Use of LSA pigmentation for the dark coatings resulted in reflectance values that approximate a much lighter visual color such as the 686A TAN in the near IR as can be seen in FIG. 6, and therefore, reduce the solar loading of the dark pigmented paint. Thermal measurements taken on coated panels under heat lamps showed a reduction of 12° F.-15° F. of the LSA pigmented coatings compared to standard pigmented control panels. This is a significant reduction of surface temperature based only on the pigmentation of the CARC system. As an added benefit, the LSA pigments enable a successful rapid cure (UV activated) coating because the high reflectance properties of the LSA pigments do not interfere with UV radiation during the cure process, thus allowing the UV radiation to initiate the photo cure process leading to a rapid crosslinking of the coating and the subsequent physical properties. The LSA pigments are essential to the rapid cure properties of the UV cure formulation and additionally result in low solar loading for dark pigmented coatings while also addressing elimination of cobalt in paint as directed by the EPA.

It is appreciated that all reagents are obtainable by sources known in the art unless otherwise specified.

REFERENCES

Asif, A., Huang, C. Y., Shi, W. F., Photopolymerization of Waterborne Polyurethane Acrylate Dispersions Based on Hyperbranched Aliphatic Polyester and Properties of the Cured Films, Colloid Polym. Sci. 2005, vol. 283, pp. 721-730.

Crawford, D. M.; Escarsega, J. A.; Dynamic Mechanical Analysis of Novel Polyurethane Coating for Military Vehicles. thermochimica acta 2000, 357-358, 161.

Escarsega, J. A.; Crawford, D. M.; Duncan, J. L.; Chesonis, K. G.; Development of Water-Reducible Polyurethane Coating for Military Applications; ARL-TR-1950; U. S. Army Research Laboratory: Aberdeen Proving Ground, MD, May 1999.

Escarsega, John A.; Chesonis, Kestutis G., Water Dispersible Low-reflectance Chemical Coating Composition, U.S. Pat. No. 5,691,410, Nov. 25, 1997.

Hegedus, C. R., Gilicinski, A. G., Haney, R. J., Film Formation Mechanism of Two-Component Waterborne Polyurethane Coatings, Journal of Coatings Technology, vol. 68, no. 852, pp. 51-61, 1996.

Koleske, J. V., ed., Paint and Coating Test Manual, ASTM International, West Conshohocken, Pa., 2012, p. 632.

Neag, C. M., Coating Characterization by Thermal Analysis, ASTM Manual 17, American Society for Testing and Materials, 1995, pp. 841-864.

Orbey, N., UV-Curable Aerospace and Aircraft Coatings, RadTech Report, July/August 2006.

Jahn, R., Jung, T., Relationship Between Pigment Properties and UV-curing Efficiency, Progress in Organic Coatings 2001, 43, 50-55.

Seo, J., Jang, E-S., Song, J-H., Choi, S., Khan, S. B., Han, H., Preparation and Properties of Poly(urethane acrylate) Films for Ultraviolet-Curable Coatings, J. Appl. Polym. Sci., 2010, 118, pp. 2454-2460.

Skrovanek, D. J., Schoff, C. K., Thermal Mechanical Analysis of Mechanical Coatings, Progress in Organic Coatings, vol. 16, 1988, pp. 135-163.

Strazisar, S., Kendi, M., Facke, T., Hermans-Blackburn, L., Feng, X. S., New High-Throughput Screening Tool for the Evaluation of Pigmented UV-A Curable Coatings-A Case Study Using Low Energy Lamps, Journal of Coatings Technology Research, 2006, Vol. 3, No. 4, pp. 307-312.

Van der Berg, K., J., Development of Waterborne UV-A Curable Clear Coat for Car Refinishes, Progress in Organic Coatings, 61, 2008, pp. 110-118.

Yang, Z, Wicks, D. A., Yuan, J., Pu, H., Liu, Y., Newly UV-curable Polyurethane Coatings Prepared by Multifunctional thiol and ene-terminated Polyurethane Aqueous Dispersions: Photopolymerization Properties, Polymer, 51, 2010, pp. 1572-1577.

Various modifications of the present invention, in addition to those shown and described herein, will be apparent to those skilled in the art of the above description. Such modifications are also intended to fall within the scope of the appended claims. Additional advantages, images and/or details of the present invention may be found in ARL Technical Report no. 6163 titled "Rapid (Ultra-violet) Cure Chemical Agent Resistant Coating (CARC)" published for government only in September 2012; ARL Technical Report no. 6284 titled "Ultraviolet Cure Coating Demonstration on Helicopter Rotor Blade Sections" published for government only in December 2012 and in a slide presentation titled "The Validation and Approval of Chemical Agent Resistant Coatings" that was presented at the ASETSDefense on Aug. 28, 2012 which are hereby incorporated by reference herein.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The present invention also provides process of rendering a vehicle resistant to detection that includes coating an exterior surface of a vehicle with any of the composition claimed below or described above and then subjecting the composition to UV light to induce curing of said composition.

The invention claimed is:

1. A water-dispersible, low observable curable composition comprising:

from about 10 to about 50 weight percent of an aqueously dispersed hydroxyl functional polyurethane resin wherein said aqueously-dispersed hydroxyl functional polyurethane resin has a molecular weight of from about 400 Daltons to about 6,000 Daltons;

from about 10 to about 50 weight percent of an aqueously dispersed urethane acrylate resin wherein said aqueously-dispersed, urethane acrylate resin is formed from (A) one or more compounds of monohydroxy-functional alcohols containing (meth)acrylate groups, (B) polyester polyols obtainable from aliphatic diols having 2 to 4 carbon atoms between the two OH functions and/or aliphatic triols or aromatic di- and/or tricarboxylic acids, and (C) one or more compounds having at least one group which is reactive towards isocyanate; and from about 0.5 to about 2 weight percent of an ultraviolet photoinitiator;

a low solar absorbing pigment that has low UV absorbance and that does not interfere with activation of the ultraviolet photoinitiator, said low solar absorbing pigment selected from the group consisting of chrome oxide, cobalt spinel, magnesium ferrite, red iron oxide ($Fe_2O_3$), black iron oxide ($Fe_3O_4$), zinc ferrite ($ZnFe_2O_4$), and combinations thereof; and from about 5 to about 50 weight percent of water wherein composition is at least "set to touch" according to ASTM standard 5895-03 following 10 minutes of flash off in spray both after 10 minutes of UVA exposure at a 14 inch lamp stand-off distance and further wherein said composition meets or exceeds MIL-DTL-64159 specification requirements.

2. The water-dispersible, low observable curable composition of claim 1 wherein said urethane acrylate resin is present from 10 percent to 50 percent total resin weight.

3. The water-dispersible, low observable curable composition of claim 1 wherein said water-dispersible, low observable curable composition further comprises low solar absorbing pigments have low UV absorbance and do not interfere with activation of the ultraviolet initiator.

4. The water-dispersible, low observable curable composition of claim 3 wherein said low solar absorbing pigments are selected from the group consisting of chrome oxide, cobalt spinel, magnesium ferrite, red iron oxide ($Fe_2O_3$), black iron oxide ($Fe_3O_4$), zinc ferrite ($ZnFe_2O_4$), and combinations thereof.

5. The water-dispersible, low observable curable composition of claim 1 further comprising a crosslinking agent.

6. The water-dispersible, low observable curable composition of claim 1 wherein said UV photo-initiator is a bis acyl phosphine dispersion.

7. The water-dispersible, low observable curable composition of claim 1 wherein said an ultraviolet initiator is present from 0.5 percent to 2 percent.

8. The water-dispersible, low observable curable composition of claim 1 further comprising a polymeric bead.

9. The water-dispersible, low observable curable composition of claim 8 wherein said polymeric bead is a blend of urea methanal condensate and polyurethane beads.

10. The water-dispersible, low observable curable composition of claim 1 further comprising an adhesion promoter.

11. The water-dispersible, low observable curable composition of claim 1 further comprising a water dispersible polyisocyanate reactive with said hydroxyl functional polyurethane resin.

12. The water-dispersible, low observable curable composition of claim 1 wherein said aqueously dispersed hydroxyl functional polyurethane resin is present at between about 10 and about 50 weight percent total resin weight and said aqueously dispersed hydroxyl functional polyurethane resin has a molecular weight of from about 400 Daltons to about 6,000 Daltons;

said aqueously dispersed urethane acrylate resin is present at between about 10 and about 50 weight percent total resin weight and is formed from (A) one or more compounds of monohydroxy-functional alcohols containing (meth)acrylate groups, (B) polyester polyols obtainable from aliphatic diols having 2 to 4 carbon atoms between the two OH functions and/or aliphatic triols or aromatic di- and/or tricarboxylic acids, and (C) one or more compounds having at least one group which is reactive towards isocyanate; and further comprises from about 5 to about 15 weight percent of a polymeric bead flattening agent wherein composition is at least "set to touch" according to ASTM standard 5895-03 following 10 minutes of flash off in spray both after 10 minutes of UVA exposure at a 14 inch lamp stand-off distance and further wherein said composition meets or exceeds MIL-DTL-64159 specification requirements.

13. The water-dispersible, low observable curable composition of claim 1 wherein said aqueously dispersed hydroxyl functional polyurethane resin is present at between about 10 and about 50 weight percent total resin weight and said aqueously dispersed hydroxyl functional polyurethane resin has a molecular weight of from about 400 Daltons to about 3,000 Daltons;

said aqueously dispersed urethane acrylate resin is present at between about 20 and about 45 weight percent total resin weight and is formed from (A) one or more compounds of monohydroxy-functional alcohols containing (meth)acrylate groups, (B) polyester polyols obtainable from aliphatic diols having 2 to 4 carbon atoms between the two OH functions and/or aliphatic triols or aromatic di- and/or tricarboxylic acids, and (C) one or more compounds having at least one group which is reactive towards isocyanate; and further comprises from about 5 to about 15 weight percent of a polymeric bead flattening agent.

14. The water-dispersible, low observable curable composition of claim 13 wherein said composition is at least "set to touch" according to ASTM standard 5895-03 following 10 minutes of flash off in spray both after 10 minutes of UVA exposure at a 14 inch lamp stand-off distance.

15. A water dispersible low observable curable composition comprising:
from about 10 to about 50 weight percent of an aqueously dispersed hydroxyl functional polyurethane resin;
from about 10 to about 50 weight percent of an aqueously dispersed urethane acrylate resin, said acrylate resin present at less than 50% total resin weight;
from about 5 to about 50 weight percent of water;
from about 0.5 to about 2 weight percent of a UV photoinitiator, and
from about 0.1 to about 40 weight percent of one or more low solar absorbing pigments selected from the group consisting of chromium oxide green, magnesium ferrite, red iron oxide ($Fe_2O_3$), black iron oxide ($Fe_3O_4$), zinc ferrite ($ZnFe_2O_4$), and combinations thereof
wherein composition is at least "set to touch" according to ASTM standard 5895-03 following 10 minutes of flash off in spray both after 10 minutes of UVA exposure at a 14 inch lamp stand-off distance.

16. The composition of claim 1 wherein said composition meets or exceeds MIL-DTL-64159 specification requirements.

17. The composition of claim 1 wherein said acrylate resin present at less than 40% total resin weight.

18. The composition of claim 1 further comprising a polymeric bead.

19. A process of rendering a vehicle resistant to optical detection comprising:
coating an exterior surface of a vehicle with the composition of claim 1;
subjecting said composition to UV light to induce curing of said composition.

20. A water-dispersible, low observable curable composition comprising:
from about 10 to about 50 weight percent of a hydroxyl functional polyurethane resin;
from about 10 to about 50 weight percent of a urethane acrylate resin;
from about 0.5 to about 2 weight percent of a UV photoinitiator sufficient to effect free radical polymerization of (meth)acrylate double bonds for polymerization induced by radiation chemistry, and
from about 5 to about 50 weight percent of water
wherein composition is at least "set to touch" according to ASTM standard 5895-03 following 10 minutes of flash off in spray both after 10 minutes of UVA exposure at a 14 inch lamp stand-off distance.

21. The water-dispersible, low observable curable composition of claim 20 further comprising:
from about 0.1 to about 40 weight percent of a low solar absorbing pigment.

22. The water-dispersible, low observable curable composition of claim 21 further comprising:
from about 0.5 to about 2 weight percent of a pigment dispersing aid; and
from about 2 to about 15 weight percent of a HDPE emulsion.

23. A water-dispersible, low observable curable composition comprising:
from about 10 to about 50 weight percent of an aqueously-dispersed, hydroxyl functional polyurethane resin wherein said aqueously-dispersed hydroxyl functional polyurethane resin has a molecular weight of from about 400 Daltons to about 6,000 Daltons;
from about 10 to about 50 weight percent of an aqueously-dispersed, urethane acrylate resin wherein said aqueously-dispersed, urethane acrylate resin is formed from (A) one or more compounds of monohydroxy-functional alcohols containing (meth)acrylate groups, (B) polyester polyols obtainable from aliphatic diols having 2 to 4 carbon atoms between the two OH functions and/or aliphatic triols or aromatic di- and/or tricarboxylic acids, and (C) one or more compounds having at least one group which is reactive towards isocyanate;
from about 0.5 to about 2 weight percent of an ultraviolet photoinitiator sufficient to effect free radical polymerization of (meth)acrylate double bonds for polymerization induced by radiation chemistry;
a low solar absorbing pigment that has low UV absorbance and that does not interfere with activation of the ultraviolet photoinitiator, said low solar absorbing pigment selected from the group consisting of chrome oxide, cobalt spinel, magnesium ferrite, red iron oxide ($Fe_2O_3$), black iron oxide ($Fe_3O_4$), zinc ferrite ($ZnFe_2O_4$), and combinations thereof;
a crosslinking agent;

an adhesion promoter; and
from about 5 to about 50 weight percent of water
wherein composition is at least "set to touch" according to
   ASTM standard 5895-03 following 10 minutes of flash
   off in spray both after 10 minutes of UVA exposure at
   a 14 inch lamp stand-off distance
and further wherein said composition meets or exceeds
   MIL-DTL-64159 specification requirements.

* * * * *